(12) United States Patent  (10) Patent No.: US 6,359,365 B1
Kalsi  (45) Date of Patent: Mar. 19, 2002

(54) SUPERCONDUCTING SYNCHRONOUS MACHINE FIELD WINDING PROTECTION

(75) Inventor: Swarn S. Kalsi, Shrewsbury, MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/632,599

(22) Filed: Aug. 4, 2000

(51) Int. Cl.⁷ .................................................. H02K 1/22
(52) U.S. Cl. .......................... 310/261; 310/162; 361/14; 505/876
(58) Field of Search ................................ 310/261, 166, 310/162, 198, 208, 68 R; 318/434; 361/923, 141; 505/166, 876, 877

(56) References Cited

U.S. PATENT DOCUMENTS

| 3,584,246 | A | * | 6/1971 | Halas | ............................ | 310/10 |
| 3,999,091 | A | * | 12/1976 | Kirtley, Jr. et al. | ............ | 310/52 |
| 4,176,292 | A | * | 11/1979 | Kalsi et al. | .................... | 310/52 |
| 4,404,486 | A | * | 9/1983 | Keim et al. | ................... | 310/198 |
| 4,820,986 | A | * | 4/1989 | Mansfield et al. | .......... | 324/322 |
| 5,066,638 | A | * | 11/1991 | Lloyd et al. | ................. | 505/166 |
| 5,121,281 | A | * | 6/1992 | Pham et al. | ................... | 361/19 |
| 5,144,179 | A | * | 9/1992 | Hilal et al. | ................. | 310/178 |
| 5,483,111 | A | * | 1/1996 | Kuznetsov | .................... | 310/12 |
| 6,064,172 | A | * | 5/2000 | Kuznetsov | .................... | 318/716 |
| 6,181,112 | B1 | * | 1/2001 | Latos et al. | .................... | 322/59 |

FOREIGN PATENT DOCUMENTS

| JP | 60-157207 | * | 8/1985 |
| JP | 409009499 | * | 6/1995 |
| JP | 409260130 | * | 3/1997 |
| JP | 02000340420 | * | 5/1999 |

* cited by examiner

*Primary Examiner*—Joseph Waks
(74) *Attorney, Agent, or Firm*—Fish & Richardson P.C.

(57) ABSTRACT

A superconducting winding includes a pair of superconducting winding sections electrically connected at a node and bypass circuitry connected between the node and electrical ground and configured to allow current to flow to electrical ground when a voltage across the superconducting winding exceeds a predetermined threshold voltage. In certain embodiments, the bypass circuitry includes a switching device (e.g., zener diode) having an open position and a closed position, the switch in the closed position to allow current flow when the voltage across the superconducting winding exceeds the predetermined threshold voltage.

30 Claims, 5 Drawing Sheets

SUPERCONDUCTING SYNCHRONOUS MACHINE FIELD WINDING PROTECTION

INCORPORATION BY REFERENCE

The following applications are hereby incorporated by referenced into the subject application as if set forth herein in full: (1) U.S. application Ser. No. 09/632,776, filed Aug. 4, 2000, entitled "HTS Superconducting Rotating Machine"; (2) U.S. application Ser. No. 09/632,602, filed Aug. 4, 2000, entitled "Segmented Rotor Assembly For Superconducting Rotating Machines"; (3) U.S. application Ser. No. 09/632, 600, filed Aug. 4, 2000, entitled "Exciter For Superconducting Rotating Machinery"; and (4) U.S. application Ser. No. 09/632,601, filed Aug. 4, 2000, entitled "Stator Support Assembly For Superconducting Rotating Machines".

BACKGROUND

The invention relates to electric machines including motors and generators.

In operation, alternating current (AC) is applied to armature windings of a motor to generate a rotating magnetic field. The rotating field is used to generate torque between the rotor and the stator causing the rotor to turn. In embodiments in which the armature (AC) windings are positioned on the stator, the rotating field rotates in space and pulls the rotor with it. If the rotating field is generated by a fixed frequency AC power source, it rotates at a fixed speed (units of RPM).

The rotating field can pull or "drag" a moveable member, whether rotor or stator, in different ways. In one approach, the dragged member may be a permanent magnet or an electromagnet powered by direct current (DC). Motors are wound with two types of poles in their rotating field, North and South. The permanent magnet, or electromagnet, and the rotating field due to the stator current lock together, north pole to south pole, and rotate together.

In another approach, the dragged member of an induction motor is a rotor winding in which the stator generated rotating field induces a current. This current reacts with the rotating field to produce torque. To induce a current, the motor's rotor winding must rotate slower than the rotating field; the difference in speed is called "slip". Slip represents the inability of the rotor to keep up with the moving rotating magnetic field generated by the stator.

The dragged member of an AC synchronous motor is its rotor, which has either a permanent magnet or an electromagnet. The motor rotation is synchronous with the AC line frequency because the rotor is locked to the rotating magnetic field which, in turn, is synchronous with the line frequency. Synchronous motors with two poles typically operate at 3600 RPM with 60 Hz power. Slower motors have four poles at 0 degrees (N), 90 degrees (S), 180 degrees (N), 270 degrees (S). Such motors run at 1800 RPM, synchronous, with 60 Hz power.

The main difference between a synchronous motor and an induction motor is that the rotor of the synchronous motor travels at the same speed as the rotating magnetic field due to stator currents. This is possible because the magnetic field of the rotor is created by field coils or permanent magnets. The rotor either has permanent magnets or dc excited currents, which are forced to lock into a certain position when confronted with another magnetic field. Thus, when the motor is operating at synchronous speed, slip and speed variation as a function of varying load does not exist.

However, with a synchronous motor, slip can occur in at least two situations. In one situation, if the load on the motor gets too high, the rotor may fall out of synchronization. In another situation, slip occurs when the motor is brought up to synchronous speed. One approach for addressing the problem of slip during start-up is to use an adjustable speed drive (ASD) to control the speed of the motor until it reaches synchronous speed. However, in some applications the cost of the ASD can surpass the cost of the motor itself. Thus, the use of an ASD may be cost prohibitive.

The problem of "slip" is particularly a problem when the winding or coil is wound with superconducting materials. When a pole slips the flux reverses through the superconducting coil. A large voltage is induced across the coil over a very short time. Most conventional windings with smaller number of turns can withstand this sharp increase in voltage for short periods. However, coils wound using superconducting materials require a large number of turns because the operating current of the wire (or tape) used to form the coil is relatively low. In this case, the high voltage, even for short periods of time, can be detrimental to a superconducting winding. For example, the high voltage can damage the insulative layers that surround the superconducting wire coils and cause a short circuit inside the coil.

SUMMARY

In a general aspect of the invention, a superconducting winding includes a pair of superconducting winding sections electrically connected at a node and bypass circuitry connected between the node and electric ground. The bypass circuitry allows current to flow when a voltage across the superconducting winding exceeds a predetermined threshold voltage.

In another aspect of the invention, the method of providing a superconducting coil including electrically connecting a pair of superconducting winding sections at a node and connecting bypass circuitry between the node and electrical ground to allow current flow when a voltage across the superconducting winding exceeds a predetermined threshold voltage.

In still another aspect of the invention, a rotor assembly includes a support member; and the superconducting winding described above.

Embodiments of these aspects of the invention may include one or more of the following features.

The bypass circuitry includes a switching device (e.g., such as a zener diode, varistor, spark gap devices) having an open position and a closed position. The switch is in the closed position to allow current flow when the voltage across the superconducting winding exceeds the predetermined threshold voltage. The bypass circuitry includes a resistive element for dissipating power flowing through the bypass circuitry, which may be cryogenically-cooled. Each superconducting winding section includes a high temperature superconductor and may be formed as a pancake coil.

Among other advantages, the bypass circuitry protects the superconducting winding from potential damage due to overvoltage. The bypass circuitry allows the thickness of the coil insulation to be reduced, thereby providing additional space for superconductor. The bypass circuitry also provides a lower cost, simpler, and generally reliable protection mechanism for the superconducting winding.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference symbols in the various drawings indicate like elements.

DETAILED DESCRIPTION

Figure 1:
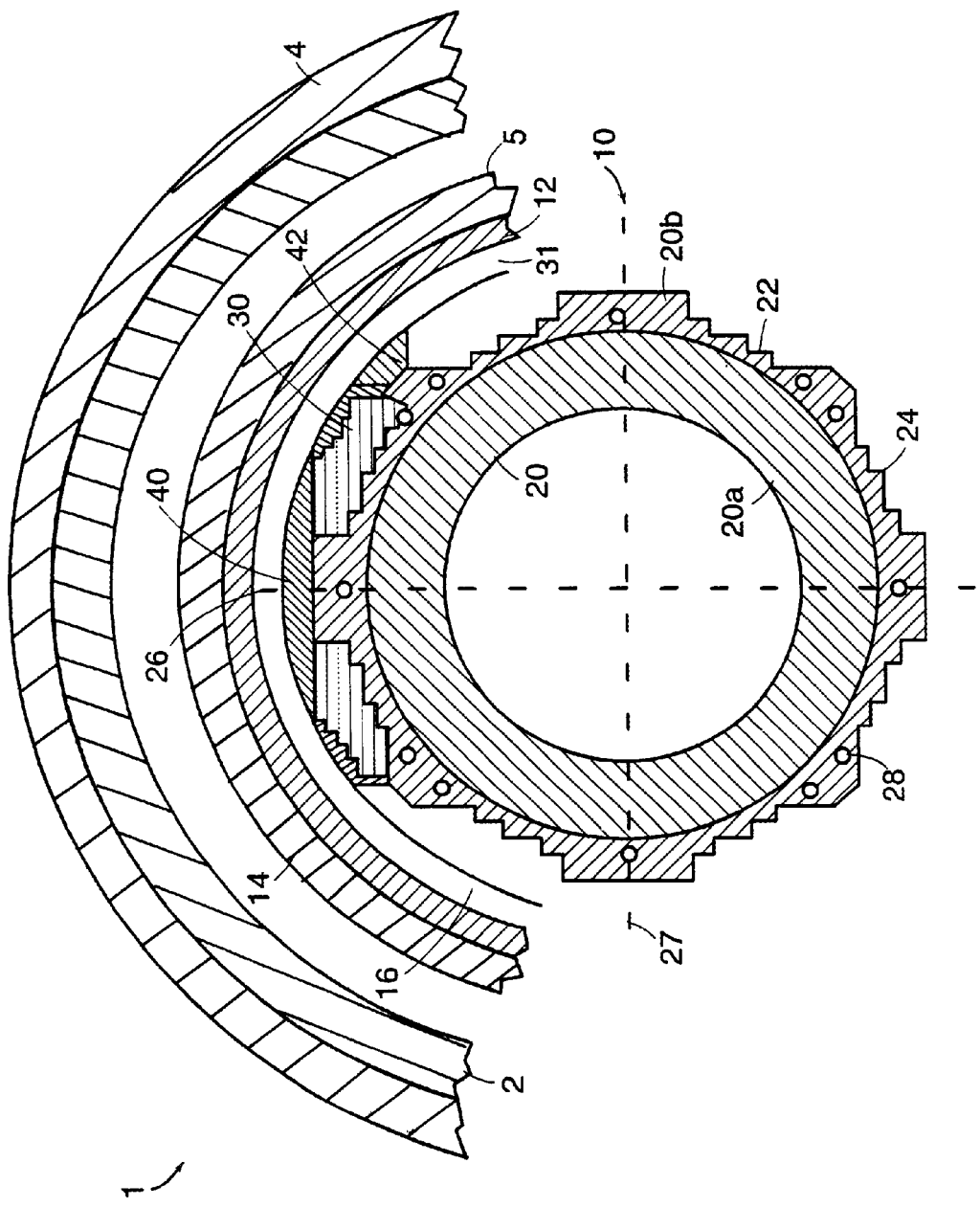
FIG. 1 is a cross-sectional end view of a portion of a synchronous motor.

Referring to FIG. 1, a superconducting synchronous motor 1 includes a rotor assembly 5 having a four-pole topology surrounded by a cryostat 12 and an outer electromagnetic shield 14, both of which are radially spaced from a cold rotor section 10 of rotor assembly 5 by a vacuum layer 16. A three-phase stator winding 2 and a laminated flux shield 4, here formed of iron, in turn, surround electromagnetic shield 14. In other embodiments, iron flux shield 4 could be replaced with a solid metallic shield made of a non-magnetic material (e.g., copper or aluminum). Electromagnetic shield 14 is fabricated from a preferably non-magnetic material (e.g., copper, aluminum, steel, etc.).

Cold rotor section 10 includes a cold support member 20 fabricated from a high-strength and ductile material (e.g., aluminum). Cold support member 20 is shown as an inner cylindrical member 20a surrounded by an outer cylindrical member 20b having an outer surface 22 with four stepped profiles 24. Each stepped profile 24 supports one of four superconducting winding assemblies 30 (only one shown here,) each winding assembly associated with a pole of the motor. In particular, each of a first diametrically opposing pair of the superconducting winding assemblies is wound about a first axis 26. Each of a second diametrically opposing pair of the winding assembly is wound about a second axis 27, transverse to axis 26. The winding assemblies are electrically connected together and are supported along the outer periphery of the support member at the stepped profiles 24 formed along axes 26, 27. As will be discussed in greater detail below, each superconducting winding assembly 30 includes bypass circuitry (FIG. 5) for protecting the winding from high voltage stress, for example, during a pole-slipping event.

Figure 2:
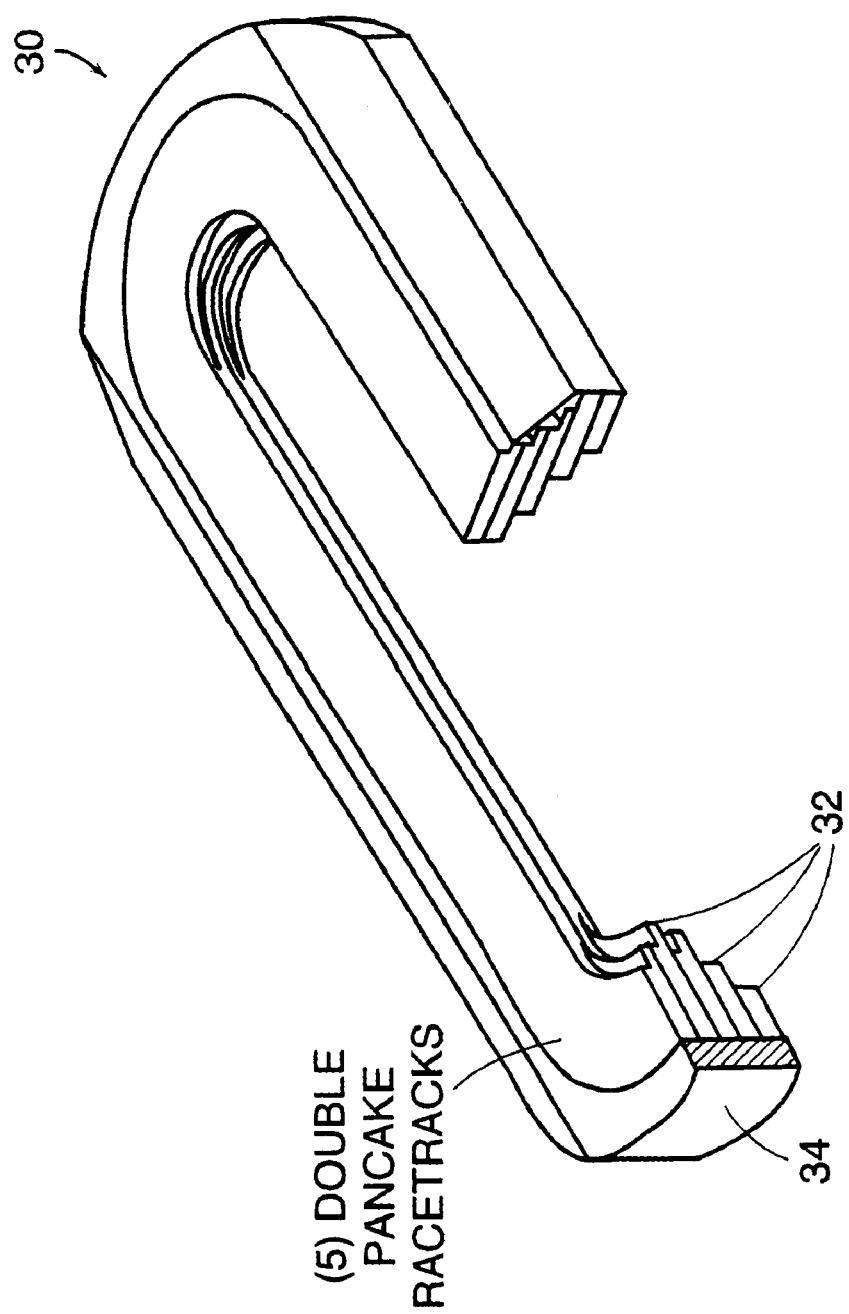
FIG. 2 is an isometric, partially cut-away view of the superconducting coil of FIG. 4 in racetrack form.

Referring to FIG. 2, each superconducting winding assembly 30 includes racetrack double pancake coils 32 positioned within a coil support structure 34. Each double pancake coil has co-wound conductors wound in parallel and one over the other. The double pancake coils are then stacked coaxially on top of each other. In this embodiment, the conductor is a high temperature copper oxide ceramic superconducting material, such as $Bi_2Sr_2Ca_2Cu_3O_x$, commonly designated BSCCO 2223. As shown here, one or more of the double pancake coils 32 may include a pancake coil having a diameter smaller than its associated pancake coil of the double pancake, the two coils of a pair being wound from the same continuous length of superconducting tape. U.S. Pat. No. 5,581,220 assigned to the assignee of the present invention describes one approach for winding a coil in this matter and is incorporated herein by reference.

Figure 3:
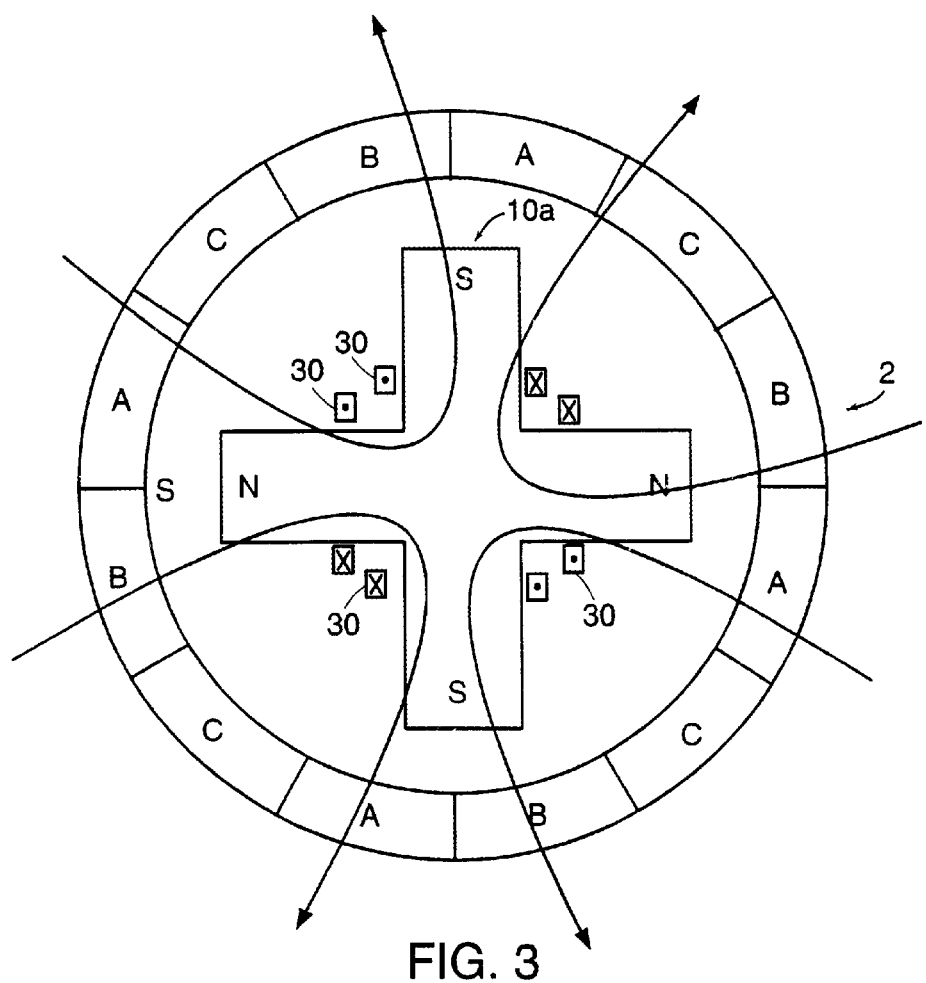
FIG. 3 is a diagrammatic view of the motor of FIG. 1 showing the relationship between the armature windings and poles.

Referring to FIG. 3, a diagrammatic representation of synchronous motor 1 is shown with a cold rotor section 10a surrounded by three-phase stator winding 2. Cold rotor section 10 is shown schematically as a four-pole, salient-pole machine and cryostat 12, electromagnetic shield 14 and iron flux shield 4 have been removed from this figure to facilitate the understanding of the operation of the machine. The number of poles in a machine is defined by the configuration of the magnetic field pattern that occurs. Because synchronous motor 1 is said to have a four-pole topology, stator winding 2 includes four sets of three phase windings (A, B, C). To generate a rotating magnetic field, each pair of poles (N & S) requires a complete set of three-phase windings. A two-pole machine would require one set of three phase windings, each phase winding displaced by 120 degrees from an adjacent winding. The torque is produced by the interaction of the superconducting coil with the armature winding current. In operation, the speed of the poles and the rotating magnetic field are both generally fixed (e.g., 1800 rpm for a four-pole machine operating from a 60 Hz power supply) with each pole of the cold rotor section being slightly misaligned with the armature magnetic flux.

Figure 4:
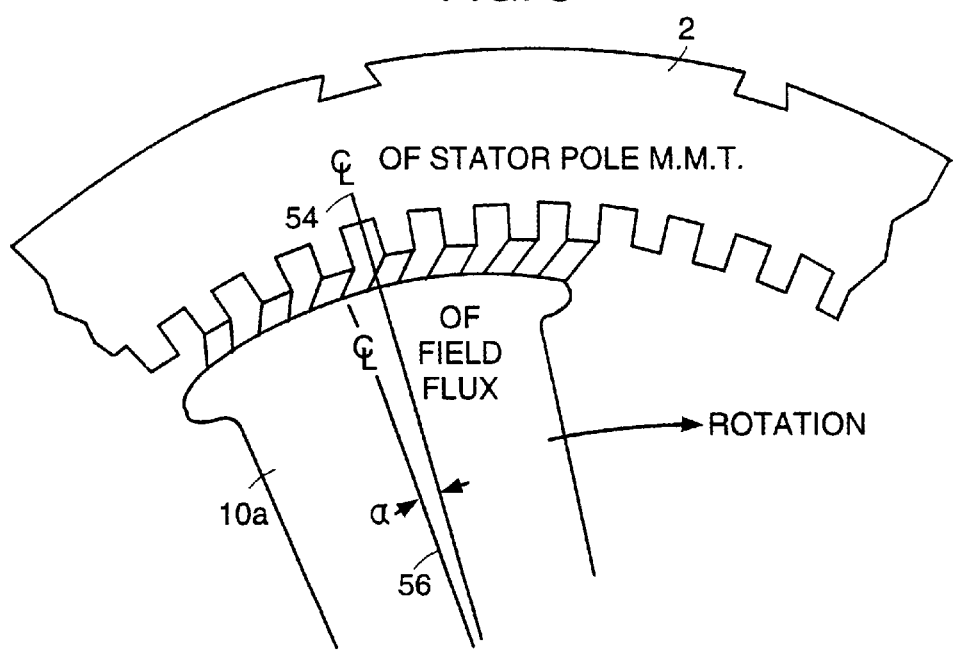
FIG. 4 is an enlarged view of a portion of the synchronous motor of FIG. 2.

Referring to FIG. 4, the slight misalignment between a rotor pole and magnetic flux is shown as a load angle ($\delta$) between the rotor field and the armature field. Load angle ($\delta$) represents a phase lag between a center line 54 of the stator winding field and a center line of the rotor pole 56. This load angle, in essence, pulls the rotor assembly 5 relative to the stator winding 2.

Referring again to FIG. 3, if the load angle exceeds 90°, coupling between the rotor pole and the rotating magnetic field is broken, and the rotor pole "slips" and is no longer in synchronization with the magnetic field. When the rotor pole slips, the pole having a particular polarity (e.g., north) interfaces with a pole of opposite polarity (e.g., south) and the magnetic flux reverses through superconducting winding 30 associated with that pole. The reversal of flux causes a large voltage to be induced across the superconducting winding 30. In general, the superconducting winding is not designed to encounter such high voltages, even if only over a very short time. Subjecting the superconducting winding to such high voltages can cause arcing to occur, potentially damaging the insulation layers surrounding each turn of the windings. If the insulation layers are damaged, superconducting winding 30 can be electrically shorted, damaging the winding. Increasing the thickness of the electrical insulation surrounding the superconducting windings occupies valuable space, which might otherwise be used by the conductor, and also makes cooling of the windings more difficult.

Figure 5:
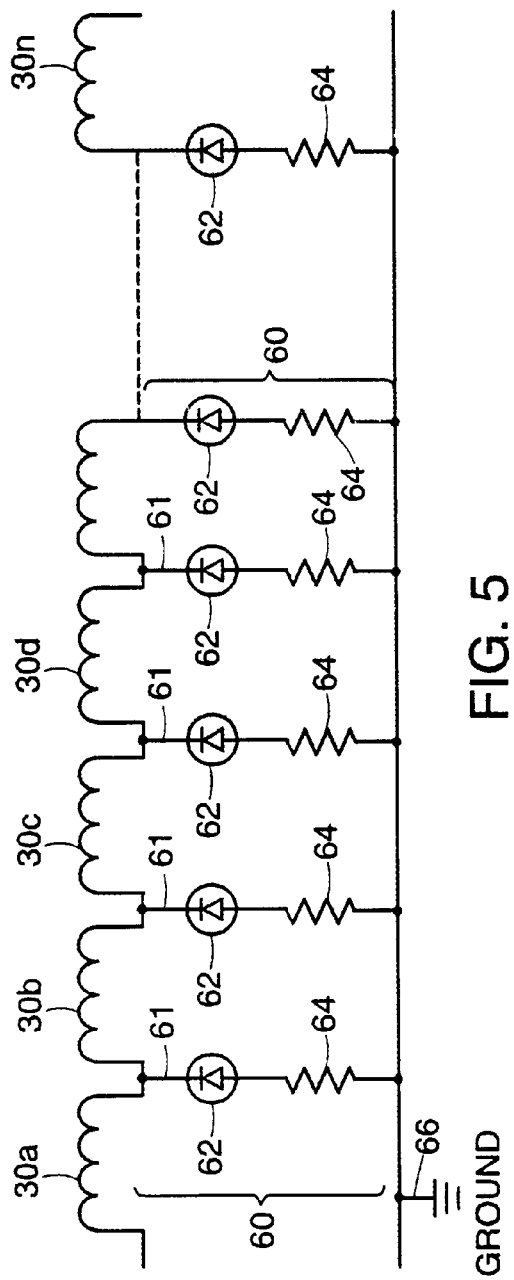
FIG. 5 is a schematic representation of a superconducting coil and protection circuit for use with the synchronous motor of FIG. 1.

Referring to FIG. 5, in order to avoid overvoltage and potential damage to the insulation of the superconducting winding, each superconducting winding is electrically segmented into winding sections 30a, 30b, 30c, . . . 30n Each winding section is connected to an adjacent winding section at a node 61. Each superconducting winding 30 also includes a bypass circuit 60 having a zener diode 62 and resistor 64 connected between an associated node 61 and electrical ground 66. In order to maintain a balanced configuration, the types and values of the zener diodes and resistors are generally selected to be the same.

No voltage is induced in coils 30a, 30b, 30c, 30d when synchronous motor 1 is operating in a steady state condition, zener diodes 62 do not conduct, and there is no loss associated with the parallel paths to electrical ground. However, during a pole slip event, when the voltage exceeds the threshold voltage (e.g., 1 KV) zener diode 62 conducts so that current is diverted through the bypass circuit path to ground and "clamps" the voltage across the winding at the threshold voltage. Resistors 64 are typically metal resistors having values selected to limit the current flowing through the parallel path and to maintain a level of current flow through the windings during the overvoltage condition. For example, during an overvoltage event, high current levels as high (e.g., as 200 A) can be generated. In this particular example, the value of resistor 64 can be selected to limit the current in the coil to its rated value. Maintaining a level of current within the coil's rated value through the winding during an overvoltage event allows the winding to be maintained in its normal steady state mode of operation. Once the motor reaches synchronization speed, the voltage across the superconducting winding will decrease to zero, below the zener threshold so that current flows almost entirely through the winding.

Figure 6:
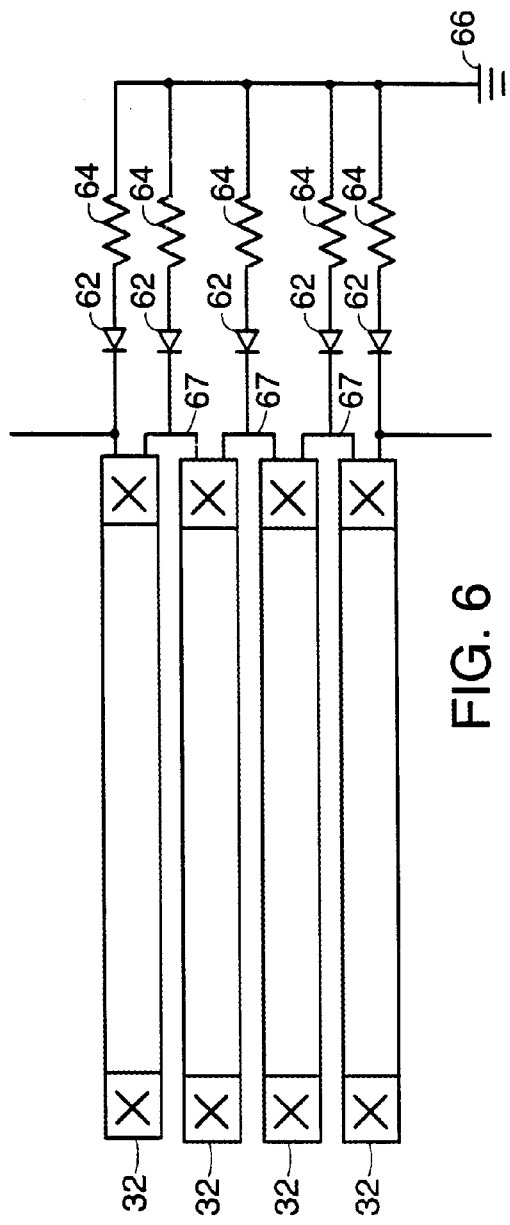
FIG. 6 is a diagrammatic representation of superconducting coil assembly having pancake coils and the protection circuit.

Referring to FIGS. 1, 2, and 6, superconducting winding assembly 30 includes double pancake coils 32 (e.g., see FIG. 2). As discussed above, to form a pancake coil (both single and double pancakes), the conductor is wound over itself from an inner diameter to an outer diameter (or vice versa). The individual pancakes are then stacked one over the other and electrically connected (e.g., soldered), generally at the pancake-to-pancake connection 67 along the outer periphery of the coil assembly. In this embodiment, the shunt connections between bypass circuits and the individual pancake coils are made via a solder joint at the pancake-to-pancake connections 67.

Figure 7:
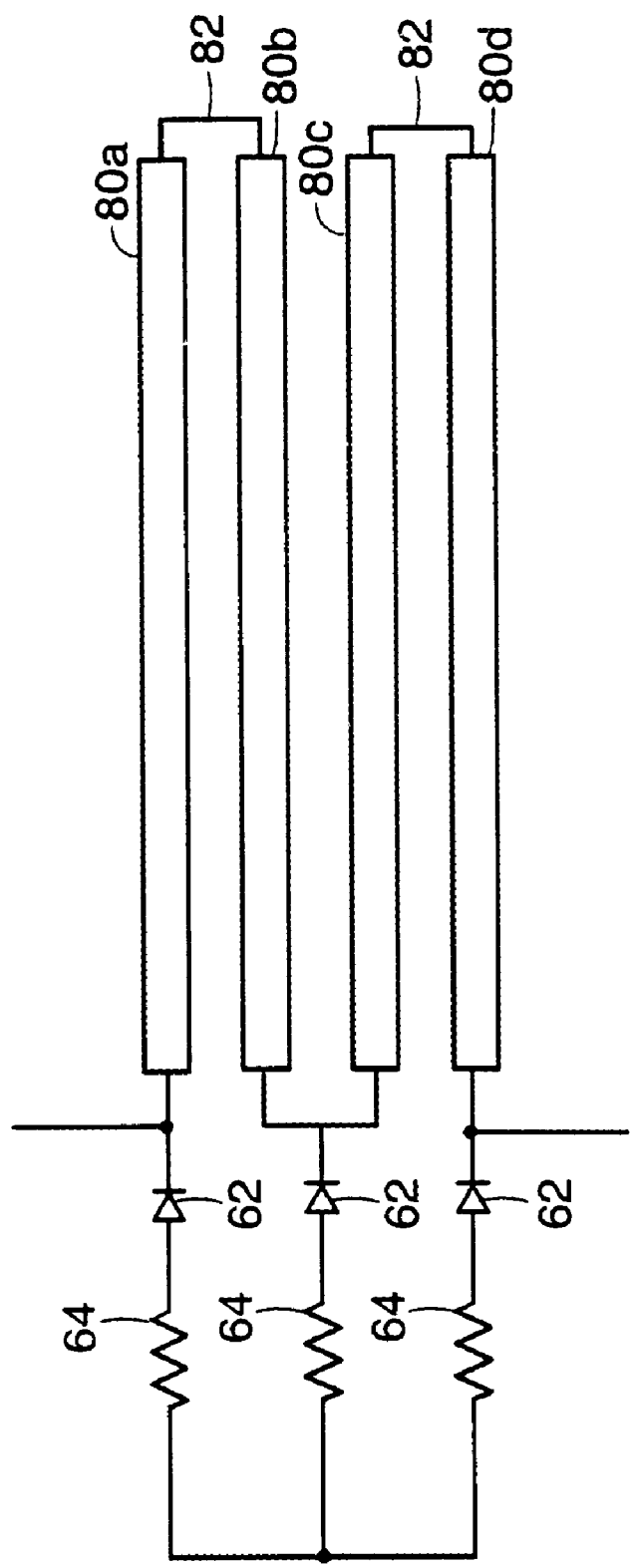
FIG. 7 is a diagrammatic representation of a layer-wound superconducting coil and the protection circuit.

Referring to FIG. 7, in an alternative embodiment, a superconducting winding assembly 80 is layer-wound. Unlike a pancake coil, a layer-wound coil is wound along the axis of the coil in one direction and then wound back over the first layer of windings in the opposite direction. In this embodiment, shunt connections 82 between the bypass circuits and sections 80a, 80b, 80c, . . . of the layer-wound coil are made through the insulation at side or end regions of the coil assembly.

A number of embodiments of the invention have been described. Nevertheless, it will be understood that various modifications may be made without departing from the spirit and scope of the invention. In the above embodiment, a zener diode was used as a switching device to control the flow of current from the winding. Other switching devices including metal oxide varisitors or spark gap devices are also equally applicable. Also, superconducting winding 30 can be divided into a relatively few or large number of sections depending on the particular application and size of the rotating machine. For example, for a 100 Mwatt two-pole synchronous machine, the superconducting windings can be divided into as many as 150 sections.

In certain embodiments, the zener diode and resistors are cryogenically cooled thereby eliminating the need for current leads to transition from cold to warm environments of the motor. Also, in the embodiment discussed above in conjunction with FIG. 1, the cold support member is in the form of an inner cylindrical member 20a and a surrounding outer cylindrical member 20b. However, in alternative embodiments, cold support member 20 may be a single integral unit.

Accordingly, other embodiments are within the scope of the following claims.

What is claimed is:

1. A superconducting winding comprising:
    a pair of superconducting winding sections electrically connected at a node; and
    bypass circuitry connected between the node and electrical ground, the bypass circuitry configured to allow current to flow to the electrical ground when a voltage across the superconducting winding exceeds a predetermined threshold voltage.

2. The superconducting winding of claim 1 wherein the bypass circuitry includes a switching device having an open position and a closed position, the switch in the closed position to allow current flow when the voltage across the superconducting winding exceeds the predetermined threshold voltage.

3. The superconducting winding of claim 2 wherein the switching device includes a zener diode.

4. The superconducting winding of claim 2 wherein the switching device includes a varistor.

5. The superconducting winding of claim 2 wherein the switching device includes a spark gap device.

6. The superconducting winding of claim 1 wherein the bypass circuitry includes a resistive element for dissipating power flowing through the bypass circuitry.

7. The superconducting winding of claim 1 wherein the bypass circuitry is cryogenically-cooled.

8. The superconducting winding of claim 1 wherein each superconducting winding section includes a high temperature superconductor.

9. The superconducting winding of claim 1 wherein each superconducting winding is a pancake coil.

10. The superconducting winding of claim 1 wherein each superconducting windings is a layer-wound coil.

11. A method of providing a superconducting coil comprising:

electrically connecting a pair of superconducting winding sections at a node;

connecting bypass circuitry between the node and electrical ground to allow current flow when a voltage across the superconducting winding exceeds a predetermined threshold voltage.

12. The method of claim 11 wherein the bypass circuitry includes a switching device having an open position and a closed position, the method including positioning the switch in the closed position to allow current to flow when the voltage across the superconducting winding exceeds the predetermined threshold voltage.

13. The method of claim 12 wherein the switching device includes a zener diode.

14. The method of claim 12 wherein the switching device includes a varistor.

15. The method of claim 12 wherein the switching device includes a spark gap device.

16. The method of claim 11 wherein the bypass circuitry includes a resistive element for dissipating power flowing through the bypass circuitry.

17. The method of claim 11 further comprising cryogenically-cooling the bypass circuitry.

18. The method of claim 11 further comprising forming each superconducting winding section with a high temperature superconductor.

19. The method of claim 11 further comprising forming each superconducting windings as a pancake coil.

20. The method of claim 11 further comprising forming each superconducting winding as layer-wound coil.

21. A rotor assembly comprising:

a support member; and a superconducting winding including:

a pair of superconducting winding sections electrically connected at a node; and bypass circuitry connected between the node and electrical ground and configured to allow current flow when a voltage across the superconducting winding exceeds a predetermined threshold voltage.

22. The rotor assembly of claim 21 wherein the bypass circuitry includes a switching device having an open position and a closed position, the switch in the closed position to allow current flow when the voltage across the superconducting winding exceeds the predetermined threshold voltage.

23. The rotor assembly of claim 22 wherein the switching device includes a zener diode.

24. The rotor assembly of claim 22 wherein the switching device includes a varistor.

25. The rotor assembly of claim 22 wherein the switching device includes a spark gap device.

26. The rotor assembly of claim 21 wherein the bypass circuitry includes a resistive element for dissipating power flowing through the bypass circuitry.

27. The rotor assembly of claim 21 wherein the bypass circuitry is cryogenically-cooled.

28. The rotor assembly of claim 21 wherein each superconducting winding section includes a high temperature superconductor.

29. The rotor assembly of claim 21 wherein each superconducting winding is a pancake coil.

30. The rotor assembly of claim 21 wherein each superconducting windings is a layer-wound coil.

* * * * *